Dec. 8, 1959  J. G. BEHRENDT  2,916,149
AUTOMOBILE HAT RACK
Filed Aug. 26, 1955
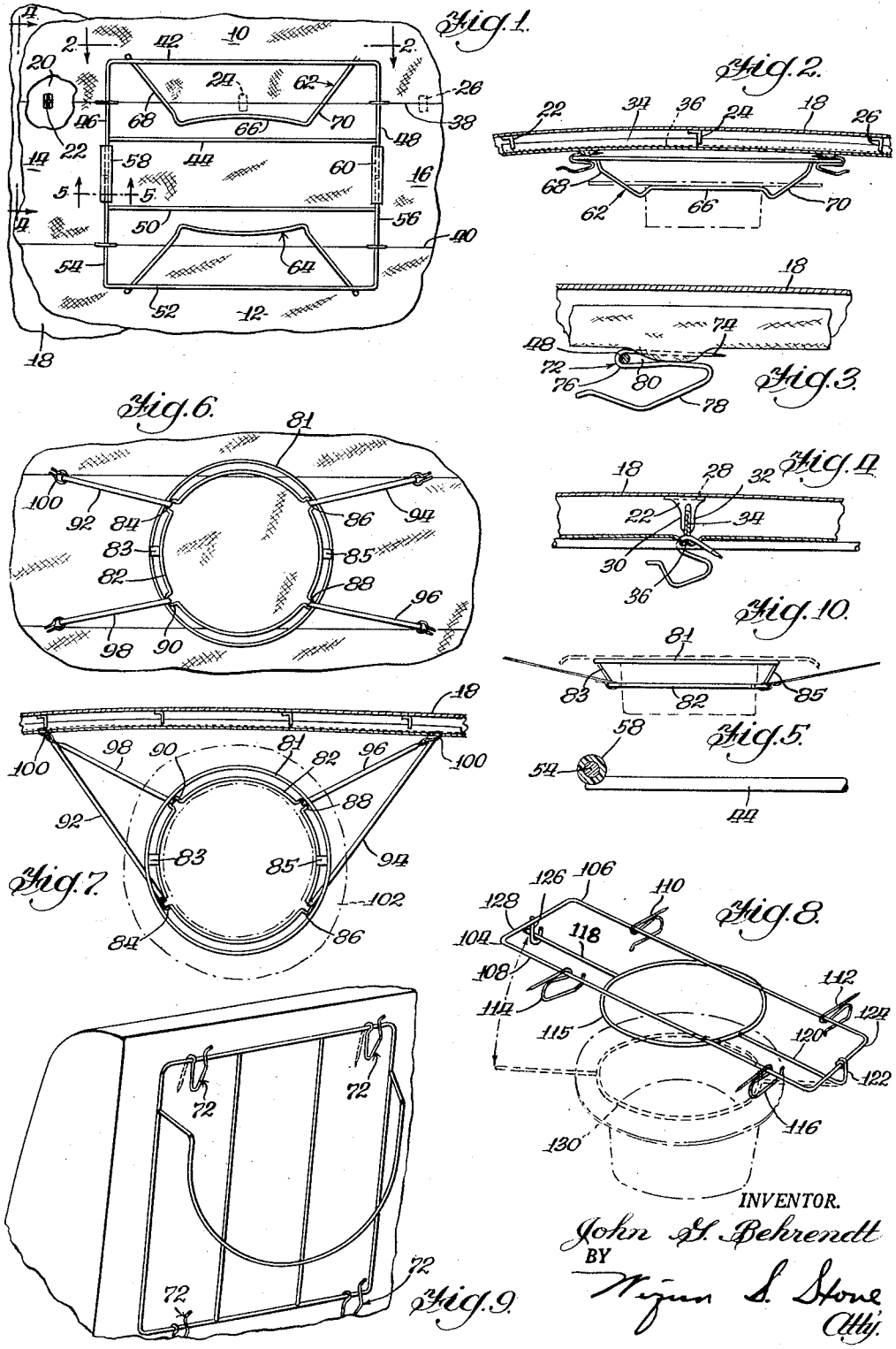
INVENTOR.
John G. Behrendt
BY
Nyman S. Stone
Atty.

United States Patent Office 2,916,149
Patented Dec. 8, 1959

2,916,149

AUTOMOBILE HAT RACK

John George Behrendt, Elmwood Park, Ill.

Application August 26, 1955, Serial No. 530,798

6 Claims. (Cl. 211—31)

This invention relates to a new and improved hat carrier or rack for suspension from the inside roof of an automobile.

The principal object of this invention is to provide a hat rack suspended from the ceiling of an automobile top into which the hat may be slipped or removed with minimum difficulty, and which hat rack may be placed beneath the ceiling of an automobile with no more effort than is necessary to force hooks through the ceiling fabric lining.

A specific object of this invention is to suspend a hat rack from the fabric lining of a passenger car ceiling by means of hooks with a minimum tendency to tear the lining. Heretofore, proposals have been made to suspend hat racks from rigid portions of automobile tops. This is not practical for modern cars where the top is a single piece of steel and the under side is covered with a textile lining. Fastening hooks through a single thickness of fabric may result in the hooks tearing the fabric. A hanger that tears the fabric cannot be sold.

The principal features of applicant's invention turn upon the transverse seams in the fabric forming the car roof lining and the use of the double thickness of these seams for suspending his hat rack. Referring to Figures 1 and 4, Figure 1 is a view looking upwardly toward the roof of a standard automobile sedan. The numeral 10 indicates the front end of the car, 12 the rear, and 14 and 16 are the sides. A portion of the steel roof of the car is indicated by the numeral 18. A portion of the fabric is cut away at 20 to disclose a steel clip 22, a side elevation of which is shown in Figure 4. Rows of these clips such as 22, 24 and 26, extend transversely along the under side of the steel top, and depending upon the make of the car, the rows are spaced from seven to eleven inches apart. Referring to Figure 4, each clip includes a base 28 welded to the roof of the car and from the base extends flexible arms 30 and 32 which press toward each other. The clips are of various types. The roof fabric is folded into transverse pleats such as 34 and stitched at 36. The upholsterer stretches the fabric, forcing the pleats successively into these clips. Looking up at the roof of the car top as in Figure 1, one sees a plurality of parallel seams 38 and 40. The clips are of various types. What is important for this invention is the double thickness of the pleat and the stitching.

An object of this invention is to provide hat racks with hooks which may be caught in these seams while placing a minimum amount of stress, particularly lateral stress, on the seams.

A feature of this invention is the provision of a hat rack having frame members which are to be positioned transversely of the seams. Mounted on these members and movable therealong are hooks so that a hook may be positioned exactly under a seam irrespective of whether the seams are seven inches or eleven inches apart.

Another object of this invention is to provide a hat rack which is accessible from opposite sides and which may be positioned transversely of a car.

Another object of this invention is to provide a simplified hat rack which is suspended from the seams by means of elastics. A second embodiment of the invention comprises two spaced rings held by straps to the car ceiling, the straps being spaced from a hat brim.

Still another object of this invention is to provide a hat rack pivotally mounted to a base member and which can be dropped down from the roof of a car and hold a hat.

These and such other objects as may hereinafter appear are attained in the embodiments of the invention shown in the accompanying drawings, wherein:

Figure 1 is a preferred embodiment of applicant's hat rack looking upwardly as it is suspended from the fabric lining of a car top;

Figure 2 is a side elevation thereof taken on the line 2—2 of Figure 1;

Figure 3 is an enlargement of the right-hand portion of Figure 2 for the purpose of illustrating the hook in the pleat;

Figure 4 is a view taken on the line 4—4 of Figure 1;

Figure 5 is a view taken on the line 5—5 of Figure 1;

Figures 6 and 10 are bottom and side elevations of a simplified hat rack suspended from the car ceiling by means of elastics;

Figure 7 is a view of the hat rack of Figures 6 and 10 showing how it can be pulled down and turned sidewise to permit insertion of a hat;

Figure 8 is a perspective view from above of a third embodiment of applicant's hat rack;

Figure 9 shows a modification of applicant's hat rack of Figure 1, but fastened to the back of an automobile seat;

Figure 10 is a side elevation of the embodiment shown in Figures 6 and 7.

Continuing to refer to the drawings, and particularly to Figures 1 to 5, applicant's preferred form of hat rack comprises a rectangular grid consisting of two parallel wires 42 and 44 joined at their ends by wires 46 and 48, and two parallel wires 50 and 52 joined at their ends by members 54 and 56. The ends of the members 46 and 54 are held in alignment by a ferrule 58 which slips over their ends. Similarly, the ends of the wires 48 and 56 are held in an abutting alignment by a ferrule 60. The grid iron consists, therefore, of two U-shaped members whose arms are in axial alignment respectively and there held by the ferrules. The two complementary units reduce the size of the shipping package.

Spot welded to end members 42 and 52 are hat brim holders 62 and 64. Each brim holder consists of a brim rail 66 supported in downwardly spaced relationship from the flat gridiron frame by arms 68 and 70.

Mounted and slidable along each end 46, 48, 54 and 56 is a pin having a finger grip. Referring to Figure 3, a pin is indicated by the numeral 72 and comprises a main pin shank 74, a loop 76 which passes over a wire frame portion as 48, and a finger gripping portion 78. The pin shank 74 and the arm of the finger grip are pinched together at 80 so that the pin will not fall off the wire 48. This pin is made of heavy wire, one-sixteenth of an inch in diameter. The wire is hard and strong and is capable of being forced through three-thirty-seconds inch leather, doubled.

In Figure 4, the pin has been turned about 45° from its normal position so that one can see how it passes through four thicknesses of the fabric and over the stitching. It is this quadruple grip on the fabric which distributes the load so as to reduce the tendency to tear.

A second embodiment of applicant's invention is shown in Figures 6 and 7 wherein a wire ring 82 carries four circumferential offsets 84, 86, 88 and 90, to each of which is fastened an elastic strap as 92, 94, 96 and 98. To the outer end of each is fastened a double hook such as 100, and these hooks are anchored by the user in the pleated seam of the fabric lining. Spaced above by members 83 and 85 is a second ring 81 which may be the same size or slightly larger than the ring 82. The brim of the hat rests on this ring as shown in Figure 10. Since the straps are fastened to the lower ring and are quite long, the straps are held away from the hat brim so that the brim is not pressed flat by the straps, see Figure 10.

The straps are very elastic so that the ring can be drawn down and turned vertically as illustrated in Figure 7, and a hat 102 inserted in it. It is then allowed to snap back against the ceiling of the car. This design is light and the pull on the straps is almost parallel to the seams. In use, the rack hangs level and free of the roof fabric.

In Figure 8, applicant shows a third embodiment of the invention consisting of a rectangular frame member 104. This view is from above, as if looking through the top of the automobile. Mounted on each long side 106 and 108 are pairs of pin fasteners 110, 112, 114 and 116. The pins of each pair may be moved toward or away from each other so that they may be positioned beneath seams. A hat ring 15 is disposed between two arms 118 and 120. The arm 120 has a portion 122 positioned at right angles thereto which is pivotally attached to end 124. The free end of the arm 118 may be hooked over a latch 126 depending from end 128. The hat ring may be dropped downwardly to the dotted-line position 130. A hat can then be inserted in it and the arm returned to the locked position.

In Figure 9, applicant shows a modification of the hat rack of Figure 1. The gridiron base is a single unit; otherwise, it and the finger pins, here identified as 72, are identical with what is shown in the first embodiment in Figures 1 through 4. The brim holder itself has been modified by being converted into a single rail.

The frame members of all of the embodiments are made of metal but other materials could be substituted.

Having thus described his invention, what applicant claims is:

1. A hat rack comprising a base frame including parallel members, a pair of pins mounted on each of said members and movable toward and away from each other, and a hat brim holder mounted on said frame and spaced from the plane thereof.

2. A hat rack comprising two U-shaped wire members positioned in a common plane with the arms of each member in axial alignment with an associated arm of the other member, a ferrule over the ends of each pair of arms for holding the two members in substantially a common plane, a hat brim holder mounted on the base portion of each U-shaped member and spaced from the plane of said members, said brim holders together being adapted to hold the brim of a hat, and a pin mounted on each of said arms of each U-shaped wire member and movable lengthwise thereof.

3. In combination with parallel seams in the roof lining of an automobile, a hat rack comprising a flat frame including a pair of elongated members and disposable at right angles to said seams, pins mounted on said elongated members and movable therealong for anchoring in the seams, and a hat holder mounted on the frame and spaced downwardly from the plane thereof.

4. A hat rack comprising a stiff ring, an eyelet mounted in each quadrant of the ring, an elastic strap fastened to each eyelet, a garment hook fastened to the free end of each strap, and a second ring laterally spaced above and rigidly mounted on the first ring whereby engaging the second ring with an upper flat surface will space the first ring from said surface.

5. A hat rack comprising a ring, an outwardly directed offset portion in each quadrant of the ring, an elastic strap having one end fastened to each offset portion, a textile hook fastened to the free end of each strap, and a second ring laterally spaced above and rigidly mounted on the first ring whereby engaging the second ring with an upper flat surface will space the first ring from said surface.

6. A hat rack comprising a flat frame, two parallel elongated members on said frame, fabric hooks mounted on each elongated member and movable lengthwise thereof, a downwardly depending but upwardly open hook fastened to one side of said frame, an arm pivotally mounted at one end to the side of the frame opposite the side carrying the hook, said arm having a length such that its end can seat in the hook, and a hat brim holder mounted on said arm.

References Cited in the file of this patent
UNITED STATES PATENTS

| | | |
|---|---|---|
| 651,231 | Canty | June 5, 1900 |
| 1,114,313 | Triebel | Oct. 20, 1914 |
| 1,379,605 | Allen | May 31, 1921 |
| 1,978,216 | Miller | Oct. 23, 1934 |
| 2,319,747 | Osborne | May 18, 1943 |
| 2,444,322 | Ajax | June 29, 1948 |
| 2,538,237 | Efner | Jan. 16, 1951 |